United States Patent
Müller

(10) Patent No.: US 11,101,476 B2
(45) Date of Patent: Aug. 24, 2021

(54) ISOLATION OF A FUEL CELL

(71) Applicant: AUDI AG, Ingolstadt (DE)

(72) Inventor: Kai Müller, Bretzfeld (DE)

(73) Assignee: AUDI AG, Ingolstadt (DE)

( * ) Notice: Subject to any disclaimer, the term of this patent is extended or adjusted under 35 U.S.C. 154(b) by 145 days.

(21) Appl. No.: 16/026,582

(22) Filed: Jul. 3, 2018

(65) Prior Publication Data
US 2019/0013533 A1  Jan. 10, 2019

(30) Foreign Application Priority Data

Jul. 7, 2017  (DE) .......................... 102017211610.2

(51) Int. Cl.
| H01M 8/04223 | (2016.01) |
| H01M 8/04313 | (2016.01) |
| H01M 8/04694 | (2016.01) |
| H01M 8/04664 | (2016.01) |
| H01M 8/04746 | (2016.01) |
| H01M 8/2483  | (2016.01) |

(52) U.S. Cl.
CPC ... *H01M 8/04246* (2013.01); *H01M 8/04313* (2013.01); *H01M 8/04671* (2013.01); *H01M 8/04694* (2013.01); *H01M 8/04753* (2013.01); *H01M 8/2483* (2016.02)

(58) Field of Classification Search
CPC combination set(s) only.
See application file for complete search history.

(56) References Cited

U.S. PATENT DOCUMENTS

| 7,358,005 | B2   | 4/2008  | Bourgeois |              |
| 8,647,784 | B2 * | 2/2014  | Nishimura | H01M 8/0267  |
|           |      |         |           | 429/429      |
| 2003/0198845 | A1 | 10/2003 | Nakanishi et al. |       |
| 2009/0169935 | A1 * | 7/2009 | Manabe | H01M 8/04298 |
|           |      |         |        | 429/457      |
| 2009/0223802 | A1 * | 9/2009 | Zak    | H01H 13/52   |
|           |      |         |        | 200/534      |
| 2014/0106251 | A1 * | 4/2014 | Ohtani | H01M 8/04238 |
|           |      |         |        | 429/432      |

FOREIGN PATENT DOCUMENTS

| CN | 101227009 A   | 7/2008  |
| CN | 101375452 A   | 2/2009  |
| DE | 10127600 A1   | 12/2002 |
| EP | 1 517 393 A2  | 3/2005  |
| JP | H09-139221 A  | 5/1997  |
| JP | 2011-228076 A | 11/2011 |

* cited by examiner

*Primary Examiner* — Ula C Ruddock
*Assistant Examiner* — Sarika Gupta
(74) *Attorney, Agent, or Firm* — Seed Intellectual Property Law Group LLP

(57) ABSTRACT

The invention relates to a device and a method for isolating a fuel cell, which make it possible to safely work on the fuel cell during a servicing or repair operation.

6 Claims, 1 Drawing Sheet

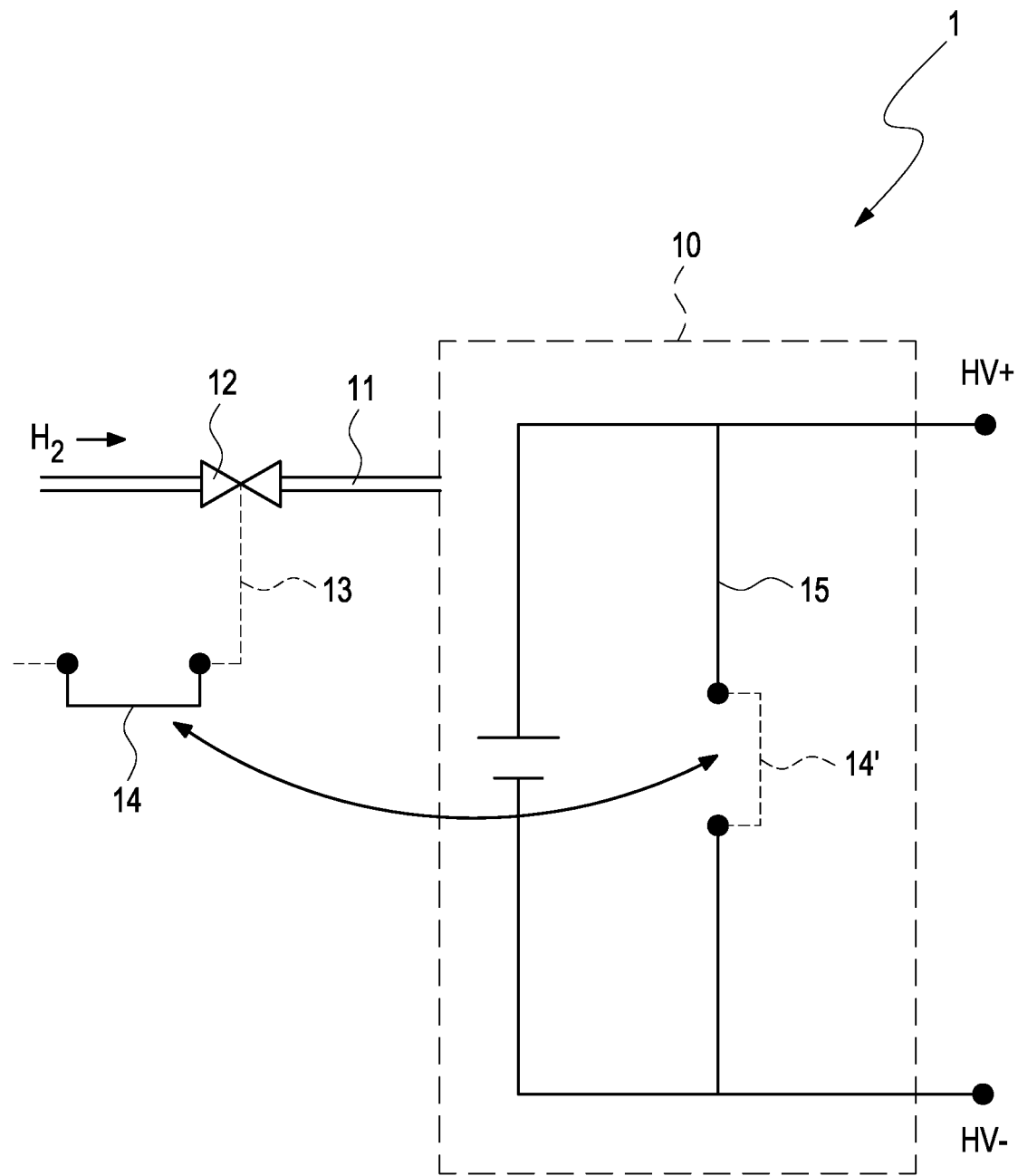

ISOLATION OF A FUEL CELL

BACKGROUND

Technical Field

The invention relates to a device and a method for isolating a fuel cell, which make it possible to work safely on the fuel cell during a servicing or repair operation.

Description of the Related Art

To be able to work on a fuel cell, e.g., as part of a servicing or repair operation, said fuel cell must be isolated according to the five safety rules of electrical engineering:
1. Isolate;
2. Secure against re-connection;
3. Verify voltage-free state;
4. Ground and short-circuit;
5. Cover or screen off adjacent live parts.

There is a risk of fire if point 4 (the shorting jumper) is forgotten or not properly carried out, and the system is still being charged with hydrogen. In addition, there is a threat of the complete destruction of the fuel-cell system.

BRIEF SUMMARY

The aim of the present invention was therefore to provide a fuel-cell system which, during a servicing or repair operation on a fuel cell, prevents a fire hazard and ensures that working on the fuel cell is safe.

Measures are already known by which individual defective fuel cells in a fuel-cell stack can be isolated from the system in order to enable continued operation of the fuel-cell system. Fuel-cell systems with automatic shut-off on overheating have also already been proposed.

A device and a method of assembling a solid-fuel fuel cell are known from EP 1 517 393 A2. If a faulty fuel cell is detected during operation, the individual fuel cell is separated from a stack of multiple fuel cells by means of a shorting jumper. In addition, the outer surface of the shorting jumper interrupts a fuel or air supply to the cell.

U.S. Pat. No. 7,358,005 B2 discloses a device and a method for isolating individual fuel cells in a fuel-cell stack, in which circuit-breakers are arranged in the fuel supply line and fuel discharge line of the fuel cells, which can be moved by means of a servomotor, in order to cut off individual fuel cells from a fuel supply.

DE 101 27 600 A1 teaches a method for generating electrical energy by means of a fuel-cell system. If an excessive temperature is detected in the fuel-cell stack, a temperature switch, which is connected in series to a main switch, shuts off the fuel-cell system by stopping the supply of hydrogen and air to the fuel-cell stack. In addition, the connection between the positive terminal and a control device can be interrupted by a switch. This switch is, in particular, coupled to the main switch, so that the energy supply of the control device can be switched on and off via the main switch.

The subject-matter of the invention is a fuel-cell system, which includes at least one fuel cell. The fuel cell has a fuel supply line, via which a fuel, e.g., hydrogen, can be supplied to the fuel cell. A valve controlled via a signal line is arranged in the fuel supply line. In its open state, the valve allows the flow of fuel to the fuel cell, and, in the closed state, blocks it. The fuel cell has a short-circuit line arranged between the positive terminal and the negative terminal of the fuel cell, with which the terminals of the cell can be short-circuited. Breaks are provided in both the signal line and the short-circuit line, which can be bridged by a shorting jumper.

In one embodiment, the breaks in the signal line and in the short-circuit line are configured so that only one of them in each case can be closed. In one embodiment, this is achieved by only a single shorting jumper being present, which bridges, alternatively, the break in the signal line or in the short-circuit line. In one embodiment, the shorting jumper is configured to be inserted into or removed from the signal line or short-circuit line manually.

In a further embodiment, the shorting jumper is mechanically encoded in such a way that it can be used only in the signal line or the short-circuit line of a fuel cell having the corresponding encoding. The encodings of the individual fuel cells of the fuel-cell system differ from each other, so that a shorting jumper cannot be used inadvertently in a different fuel cell from the one associated with it.

In another embodiment, the break in the signal line and the break in the short-circuit line are so linked that closing one break causes the other break to open. If the break in the signal line is closed, the short-circuit line will be broken; if the break in the short-circuit line is closed, in other words the fuel cell is shorted, the signal line will be broken, and the supply of fuel to the fuel cell thus stopped. In one embodiment, the opening and closing of the breaks is carried out by a switching relay. Both the signal line and the short-circuit line are connected to the relay and are alternately opened or closed by the relay.

In the operating state, the break in the signal line is bridged with a shorting jumper or signal jumper so that the valve is open; the break in the short-circuit line is open. When the signal line is broken, the valve closes and interrupts the flow of fuel to the fuel cell.

A characteristic feature of the present invention is the coupling of the shorting jumper for shorting the terminals of the fuel cell with the blocking of the shut-off valve for the fuel supply line. The shorting jumper also serves as a signal jumper for the shut-off valve, i.e., when the jumper is used for shorting, the signal line for the shut-off valve is broken.

The subject matter of the invention is also a method for maintenance or repair of a fuel cell of a fuel-cell system according to the invention. At the beginning of a maintenance or repair operation on a fuel cell, the signal line to a valve in the fuel supply line of the fuel cell is broken, and a break in a short-circuit line arranged between the positive terminal and the negative terminal of the fuel cell is closed.

The maintenance or repair operation can now be safely carried out, since the fuel cell has been isolated and the fuel supply interrupted.

Upon completion of the maintenance or repair operation on the fuel cell, the short-circuit line is again broken, and the break in the signal line is closed. The fuel cell is thus ready for operation again.

In one embodiment of the method, the break in the signal line and the closing of the break in the short-circuit line, or the break in the short-circuit line and the closing of the break in the signal line is effected by reinserting a single shorting jumper which can bridge the break in the signal line as well as the break in the short-circuit line. Moving the jumper from the signal line to the short-circuit line isolates the fuel cell and interrupts the fuel supply; moving the jumper from the short-circuit line to the signal line opens the shut-off valve of the fuel supply, and the fuel cell is thus made operational again.

The advantages of the present invention include the risk of fire and also the destruction of the fuel-cell system both being effectively prevented, and safety in working on fuel cells of the system being ensured. In addition, carrying out a repair or maintenance operation on a fuel cell is simplified. Further advantages result from the description and the drawing.

It goes without saying that the features mentioned above and the features yet to be explained below can be used not only in the respectively specified combination but also in other combinations or alone, without leaving the scope of the present invention.

BRIEF DESCRIPTION OF THE SEVERAL VIEWS OF THE DRAWINGS

An embodiment of the invention is schematically shown in the drawing and is further described by reference to the drawing. The following is shown:

FIG. 1 shows a schematic representation of an embodiment of the fuel-cell system according to the invention.

DETAILED DESCRIPTION

FIG. 1 shows an embodiment of the fuel-cell system 1 according to the invention with a fuel cell 10. The fuel cell 10 is supplied with hydrogen via a fuel supply line 11. The hydrogen line 11 contains an electric valve 12 which is controlled via a signal line 13. A signal bridge 14 is arranged in the signal line 13. When the shorting jumper 14 is removed, the valve 12 closes and stops the flow of hydrogen through the line 11. The shorting jumper 14 is then inserted as shorting jumper 14' into the short-circuit line 15, which is arranged between the positive and negative terminals of the fuel cell 10, and short-circuits the terminals of the fuel cell 10.

The fuel cell 10 is thus isolated for a repair or servicing operation. Upon completion of the repair or servicing operation, the shorting jumper 14' is removed from the short-circuit line 15 and re-inserted in the signal line 13 of the valve 12 as a signal bridge 14. The changes in position are indicated in the FIGURE by arrows.

LIST OF REFERENCE SYMBOLS

1 Fuel-cell system
10 Fuel cell
11 Hydrogen supply line
12 Shut-off valve
13 Signal line
14 Signal bridge
14' Shorting jumper
15 Short-circuit line

The invention claimed is:

1. A fuel-cell system, comprising:
at least one fuel cell having:
a fuel supply line having a valve controlled by a signal line;
a short-circuit line arranged between a positive terminal and a negative terminal of the at least one fuel cell; and
a shorting jumper that is configured to:
bridge a first break in the signal line and open a second break in the short-circuit line when the shorting jumper is removed from the short-circuit line and inserted into the signal line; and
bridge the second break in the short-circuit line and open the first break in the signal line when the shorting jumper is removed from the signal line and inserted into the short-circuit line.

2. The fuel-cell system according to claim 1, wherein the shorting jumper is mechanically encoded such that the shorting jumper is configured to be used only in the signal line or the short-circuit line of the at least one fuel cell having a corresponding encoding to receive the shorting jumper.

3. The fuel cell system according to claim 1, wherein the shorting jumper is configured to be inserted into or removed from the signal line or short-circuit line manually.

4. A fuel-cell system, comprising:
at least one fuel cell having:
a fuel supply line having a valve controlled by a signal line;
a short-circuit line arranged between a positive terminal and a negative terminal of the at least one fuel cell; and
a shorting jumper configured to be moved from a first break in the signal line to a second break in the short-circuit line to open the first break and bridge the second break and to be moved from the second break to the first break to bridge the first break and open the second break.

5. The fuel-cell system according to claim 4, wherein the shorting jumper is mechanically encoded such that the shorting jumper is configured to be used only in the signal line or the short-circuit line of the at least one fuel cell having a corresponding encoding to receive the shorting jumper.

6. The fuel cell system according to claim 4, wherein the shorting jumper is configured to be moved between the signal line and the short-circuit line manually.

* * * * *